Dec. 29, 1936.    M. KNOBEL ET AL    2,065,713
EDGE TESTING MACHINE
Original Filed Dec. 11, 1933    3 Sheets—Sheet 1
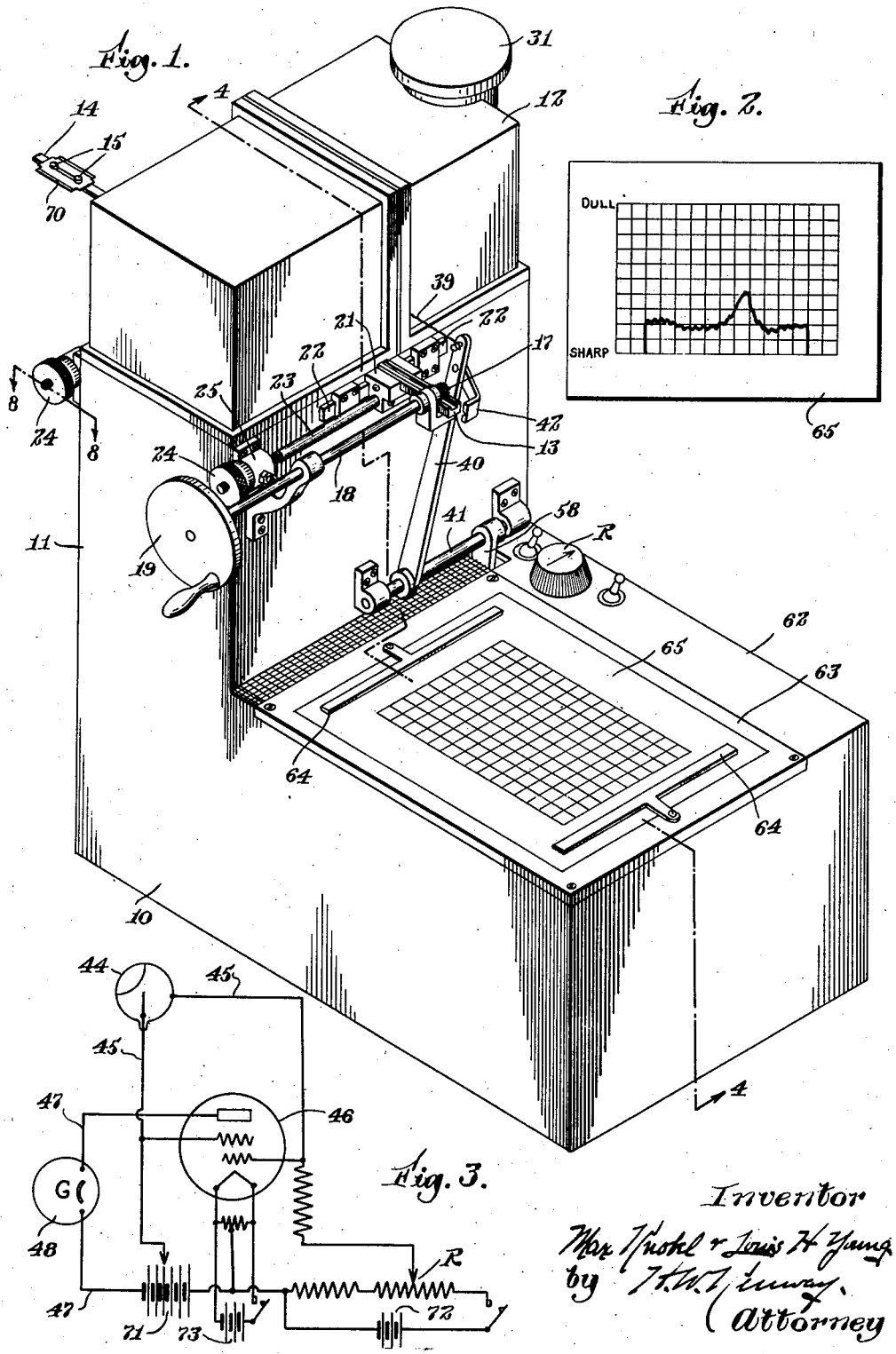

Dec. 29, 1936. M. KNOBEL ET AL 2,065,713
EDGE TESTING MACHINE
Original Filed Dec. 11, 1933   3 Sheets-Sheet 2
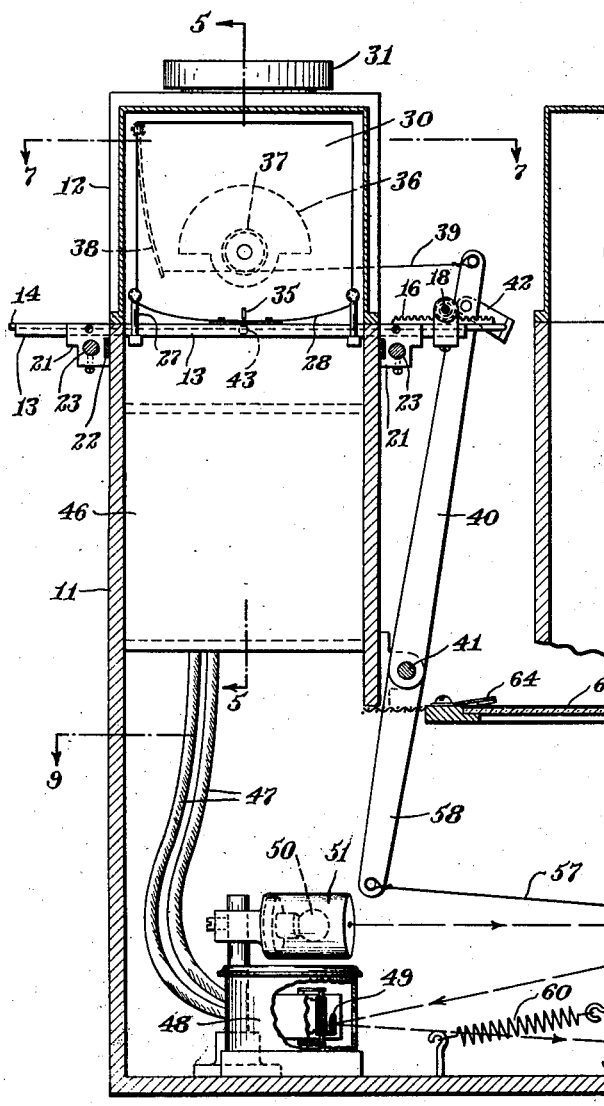
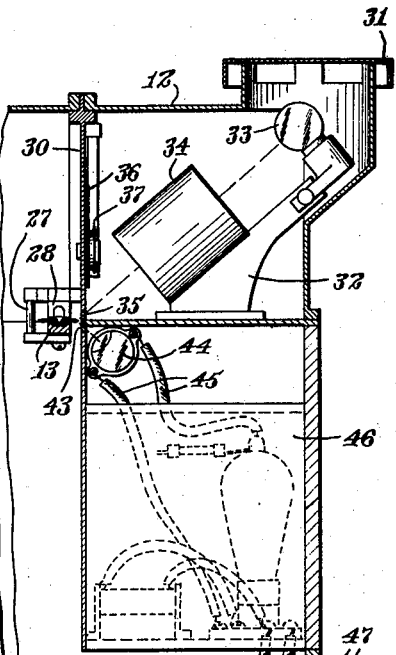

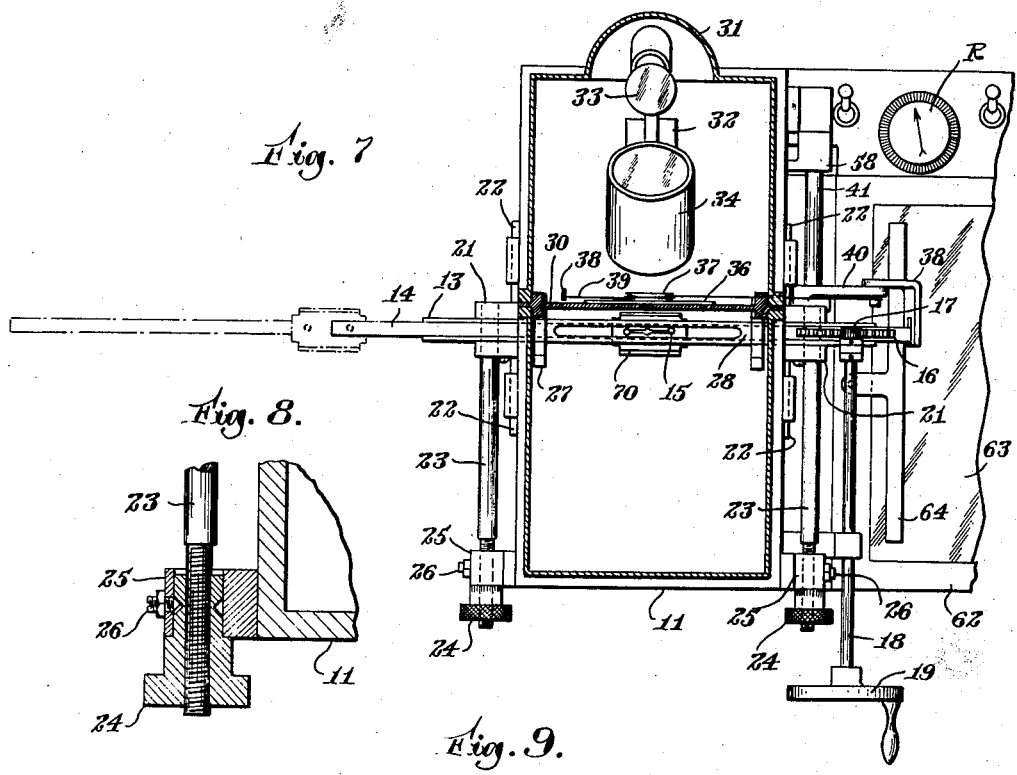
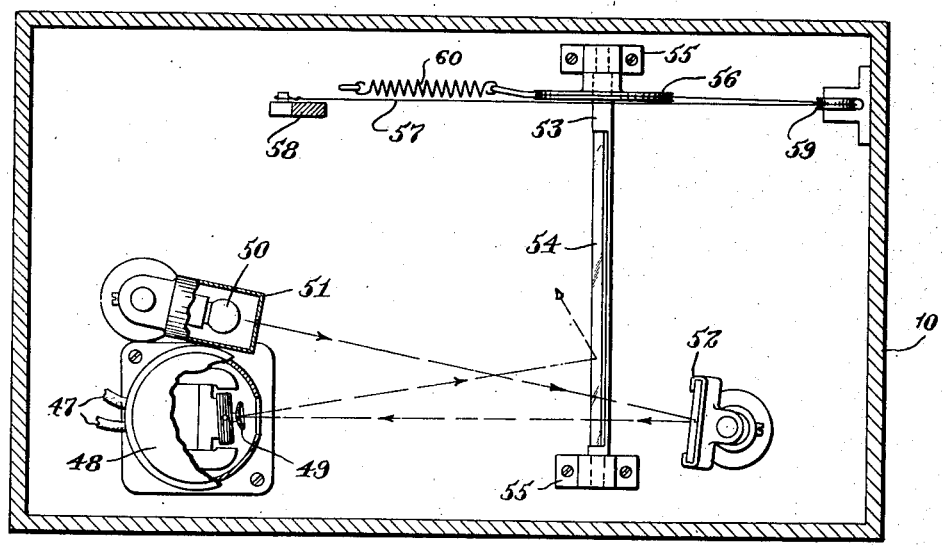

Patented Dec. 29, 1936

2,065,713

UNITED STATES PATENT OFFICE 2,065,713

EDGE TESTING MACHINE

Max Knobel, Arlington, and Louis H. Young, Auburndale, Mass., assignors to Gillette Safety Razor Company, Boston, Mass., a corporation of Massachusetts Refiled for abandoned application Serial No. 701,841, December 11, 1933. This application May 17, 1935, Serial No. 22,118

21 Claims. (Cl. 88—14)

This application is a substitute for applicants' earlier application, Serial No. 701,841, filed December 11, 1933.

This invention relates to machines for testing the edges of blades for sharpness. An important field of use for such machines is in connection with the testing of safety razor blades and, accordingly, the invention will be described in that connection, although it will be evident that many features of the invention are equally applicable to the testing of sharp edges wherever found and of whatever character.

When the manufacturing operations on safety razor blades have been completed the blades are subjected to tests or inspection designed to detect faults or imperfections in the edge of the blade. Such tests are difficult to make satisfactorily in routine production because of the fragile nature of a razor edge and because of the difficulty of handling the product rapidly without danger of cutting. Furthermore, the human factor introduces variations in results which are unavoidable as a practical matter, so that blades which have passed inspection are not always up to the desired standard.

The present invention deals especially with this problem. It aims to provide a convenient machine or apparatus for testing the sharpness of blade edges with a view to reducing the expense involved in this operation and bringing about more uniform results, without liability of damaging the sharpened edge or danger to the operator. Furthermore, it aims to provide a machine which may be conveniently used for checking the results of the manufacturing operations in producing sharp edges under factory conditions so that the quality of the product may be always under surveillance.

In another aspect the present invention consists in a further development of the method disclosed in our prior Patent Number 2,027,595, granted January 14, 1936, and which is based upon the principle that if a beam of light is directed upon a sharpened edge the amount of light reflected by said edge will be found to bear a definite relation to the sharpness of the edge, that is to say, the duller the edge the more light will be reflected by it. The machine of the present invention is designed to carry into effect the method above outlined and to supply accurate, reliable and direct means for transforming measurements of the light reflected from progressive portions of the blade edge into visible indications which can be directly observed or recorded by the operator.

With these objects in view the machine of our invention comprises means for traversing the edge of a blade by a light beam, combined with means for indicating by a moving spot of light the amount of light reflected by progressive portions of the edge of the blade under investigation. One satisfactory mechanism for accomplishing this result includes a source of light arranged to direct a beam upon the sharpened edge of a blade as the latter is moved relatively thereto, and a photo-electric cell arranged to receive such light as may be reflected from the cutting edge of the blade during the traversing operation. An electric current flowing through the photo-electric cell may thus be variably controlled and manifested in the oscillation of a galvanometer mirror or other indicating device. One construction suitable for rendering such indication readily observable is disclosed herein and in accordance with a further feature of our invention it comprises a second source of light arranged to direct a light beam upon the galvanometer mirror and then upon a translucent plate or the like, in combination with means for deflecting such light beam in two different directions, first proportionately with the movement of the blade itself, and second, in accordance with the amount of current flowing through the photo-electric cell, which is governed in the first instance by the dullness or sharpness of the edge under investigation.

In addition to the broader features above discussed our invention includes other valuable characteristics of construction of general application to edge testing machines of the character under discussion. For example, a novel and accurate blade-feeding mechanism is herein disclosed having provision for relative adjustment of the blade under investigation with respect to the source of light, or the path of the light beam utilized for the purposes of inspection. The invention includes also a novel optical system wherein the single indication is made responsive both to blade displacement and to character of blade edge, and the whole organization of the machine is such that successive blades may be tested rapidly and with significant results without requiring a high degree of skill on the part of the operator.

These and other features of the invention will be best understood and appreciated from the following description of a preferred embodiment thereof, selected for purposes of illustration and shown in the accompanying drawings, in which—

Fig. 1 is a view in perspective of the apparatus;

Fig. 2 illustrates a specimen chart produced in the use of the apparatus;

Fig. 3 is the wiring diagram of the apparatus;

Fig. 4 is a view of the apparatus in longitudinal section on the line 4—4 of Fig. 1;

Fig. 5 is a view in longitudinal section, at right angles to that shown in Fig. 4, of the upper part of the apparatus, being taken on the line 5—5 of Fig. 4;

Fig. 6 is a view on an enlarged scale indicating the course of the light beam in meeting the edge of a blade being tested;

Fig. 7 is a plan view, partly in section, of a portion of the apparatus;

Fig. 8 is a view on an enlarged scale of a portion of the adjusting mechanism for the blade carrier; and Fig. 9 is a plan view, partly in section of the lower part of the apparatus.

The casing or frame of the apparatus may be of any suitable shape to support and protect its elements. As herein shown, it comprises a lower rectangular casing 10 from one end of which projects an upright casing 11, also of rectangular shape, and this in turn is surmounted by a removable light-box 12.

The front and rear walls of the upper edge of the casing 11 are cut-away to receive a horizontal guide bar 13 having an open track in its upper side for a movable carrier slide 14. The slide is provided with upstanding studs 15 designed to fit corresponding internal apertures of the blades to be tested and to hold them accurately and positively in position upon the carrier slide. At its rear end the carrier slide is provided with rack teeth 16 and these mesh with a pinion 17 fast to the inner end of a transverse shaft 18 journaled in brackets secured to the back of the casing 11. At its outer end the shaft 18 is provided with a handwheel 19 by which it may be conveniently rotated and the carrier slide moved in one direction or the other in its guide bar 13.

The guide bar 13 is directly mounted in a pair of carrier blocks 21 each of which is provided with a transverse bar 22 arranged to slide horizontally in spaced guide members secured to the front and rear walls of the casing 11. An adjusting rod 23 is secured to each of the carrier blocks 21 and is journaled at its outer end in a bearing bracket 25 also secured to the casing 11. A knurled nut 24 is threaded upon the outer end of each of the adjusting bars 23 and is prevented from movement longitudinally of the adjusting rod by a pointed screw 26 threaded into the bracket 25. The result of this construction is that the carrier blocks 21 and the guide bar 13 may be accurately and positively adjusted transversely in the casing within convenient limits either bodily or one end at a time. Each knurled nut 24 is provided with a graduated scale to indicate the setting of the carrier bar.

Within the casing and adjacent to its opposite walls the guide bar 13 is provided with a pair of brackets each carrying an upright post 27 having a short cross-bar and between these is supported a downwardly curved spring 28 which is arranged to engage the surface of a blade upon the carrier 14 as it passes through the casing and to hold the blade firmly in position thereon without danger of displacement. The spring is provided with a longitudinal slot along which travel the studs 15 of the carrier slide.

The light-box 12 has an inner vertical partition 30 which extends downwardly into the casing 11. It is also provided with a ventilator casing 31 for a light bulb 33 which is adjustably supported therein upon a bracket 32 in the light-box. The bracket 32 also supports a downwardly inclined tube 34 carrying a concentrating lens 5 by which the light beam of the lamp bulb 33 is directed through an aperture 35 in the partition 30 and focused upon the edge of a blade positioned on the carrier slide 14.

The light aperture 35 in the partition 30, as shown in Fig. 4, is a short vertical slot. Shutter mechanism is provided for closing the aperture except during the passage of a blade past it. The specific type of shutter herein shown comprises a disk 36 mounted to rotate upon a journal projecting inwardly from the partition 30 and having a 180° segment cut from its periphery. Formed integral with the shutter disk 36 is a grooved hub 37 and this acts as a pulley about which passes a driving cord 39. The cord 39 at one end is secured to the free end of a leaf spring 38 fastened to the inside wall of the light-box 12 and the other end to the upper end of the long lever 40 which is fastened at its lower end to a transverse shaft 41 journaled in bearings 25 secured to the rear face of the casing 11, as well shown in Fig. 1. Near its upper end the lever 40 carries an angle piece 42 and the inner end of this is arranged to stand in the path of the feed slide 14 and to be engaged by the latter as it is advanced in the guide-bar 13. The result is that, when the handwheel of the feed mechanism is turned, the shutter disk 36 is rotated against the tension of the spring 38 to uncover the aperture 35 at the moment when the advancing end of a blade positioned upon the carrier slide arrives opposite thereto. The length of the cut-out segment is such that thereafter the aperture 35 is maintained uncovered until the blade to be tested has been moved longitudinally past the aperture. In Fig. 4 the shutter disk 36 is shown in its wide open position, the carrier slide 14 being substantially in mid position. When the handwheel is turned reversely in restoring the feed slide to its blade receiving position the shutter disk 36 is moved in the opposite direction and the shutter disk is turned to its closed position.

It will be seen that the feed movement of the carrier slide causes the light beam passing through the aperture 35 to traverse the edge of the blade to be tested. In the construction illustrated the light beam is stationary and the blade is moved with respect to it but it will be clear that the same results may be secured by holding the blade stationary and causing the light beam to move.

As best shown in Fig. 6, the light beam is directed at an angle of substantially 45° upon the extreme vertex of the cutting edge of the blade 70. A second aperture 43 is provided in the partition 30 directly below the aperture 35 and below the bottom partition of the light-box 12. Whatever light may be reflected or scattered from the vertex of the edge of the blade 70 passes therefrom through the aperture 43 and into a photo-electric cell 44 which is properly positioned and mounted in the upper part of the casing 11. The photo-electric cell 44 is connected by wires 45 to an amplifier unit 46. It is unnecessary to describe the details of the amplifier 46 more than to say that it may be of any satisfactory or commercial type and as such is effective to amplify the current of electricity flowing through the photo-electric cell 44 and fluctuating in accordance with the amount of light received from successive portions of the edge of the blade being tested.

The amplifying unit 46 is connected by wires 47 to a galvanometer 48 mounted in the casing 10 and being provided with a movable concave mirror 49 which is arranged to swing transversely proportionally to the amount of current which the photo-electric cell 44 permits to flow in the circuit. The photo-electric cell 44 accordingly measures and the galvanometer 48 indicates the amount of current flowing in the circuit which includes these two instrumentalities.

As already stated, the measuring current in the galvanometer 48 is effective to swing the galvanometer mirror 49 through an arc of greater or lesser amplitude depending in the first instance upon the amount of light reflected by the edge of the blade 70 at each particular instant. The movement of the galvanometer mirror 49 is indicated by a light beam emanating from a light bulb 50 adjustably mounted upon a standard projecting above the galvanometer and enclosed within an apertured casing 51. A stationary but adjustable mirror 52 is mounted within the casing 10 opposite to the light bulb 50 and adjusted so as to receive the light beam from the bulb 50 and direct it back again upon the galvanometer mirror 49. The beam thus received is reflected outwardly against a long narrow mirror 54 mounted upon a transverse shaft 53 which is journaled in suitable bearings 55 secured to the bottom of the casing 10. From the mirror 54 the light beam is reflected upwardly and is manifested as a luminous spot upon a ground or clear glass plate 63 which forms the cover of a part of the casing 10.

We shall now proceed to describe one form of mechanical means for progressively varying the location of such indication in accordance with the movement of the blade. As already explained the long lever 40 is connected to a transverse shaft 41 and it is effective to oscillate this shaft as it is rocked by the reciprocation of the carrier slide 14 and the action of the spring 38. Secured to one end of the shaft 41 is a downwardly extending lever arm 58. At its lower end the arm 58 is secured to a driving cord 57 which extends about an idle pulley 59 journaled in a bracket upon the rear wall of the casing 10 and thence to a grooved sector 56 fast to one end of the mirror shaft 53. The mirror shaft and sector are free to oscillate and a tension spring 60 is connected to one end of the sector. This tends always to move it in a counterclockwise direction as seen in Fig. 4 and consequently, initially to hold the mirror 54 in such a position as to direct the light beam toward the inner end of the ground glass plate 63. However, when the lever 40—58 is rocked the driving cord 57 oscillates the sector and mirror 54 connected thereto so that the light beam moves longitudinally across the surfaces of the ground glass plate 63. So long as the galvanometer mirror 49 remains at rest the trace of the light beam upon the ground glass is a horizontal straight line or base line but movement of the mirror 49 transversely, varies the location of the light beam causing it to depart from the straight base line. In the apparatus herein shown the more light reflected from the edge of the blade 70 (indicating a dull edge) the more is the galvanometer mirror 49 moved and the farther from the base line is the trace of the indicating light beam deflected.

As a convenient means of recording the sharpness characteristics of individual blades a ruled translucent sheet 65 may be clamped in position upon the ground glass by clips 64. The operator may then slowly turn the handwheel 19 with his left hand and with a pen or pencil trace upon the sheet 65 the path of the indicating light beam. Fig. 2 illustrates a typical curve formed in this manner. The significance of the illustrated curve is that the edge of the tested blade is fairly and uniformly sharp throughout the first half of its length. It then presents a decidedly dull portion followed by a very keen portion and then the remainder of the blade has a fairly sharp edge again. After one passage through the machine the blade may be reversed upon the slide carrier and the process repeated in testing its other edge. Usually curves indicating the characteristics of two edges may be conveniently placed on a single sheet without confusion or if preferred the sheet may be displaced between the recording of two consecutive curves.

The machine herein shown, is designed to trace a curve of about twice the length of the blade being tested, but it will be apparent that any desired ratio or multiplication may be brought about, although in all cases the variations in the location of the indication is accurately timed with the advancing movement of the blade being tested. The purpose of using the stationary mirror 52 with the light bulb 50 and the galvanometer mirror 49 is to render convenient the employment of a relatively long light beam without unduly enlarging the casing of the machine. It will be understood that optically identical results would be secured by locating the light bulb 50 the same distance behind the point now occupied by the mirror 52. Preferably, and as herein shown, the optical distance from the concave mirror 49 to the plate 63 is substantially twice the focal length of the mirror and also equal to the distance from the aperture of the casing 51 to the mirror 49.

The wiring of the machine is diagrammatically shown in Fig. 3 in which reference characters 44 and 48 indicate the photo-electric cell and galvanometer, respectively. The amplifier unit is also indicated by reference character 46. A source 71 of electro-motive force is provided for causing current to flow through the photo-electric cell 44. A source of electro-motive force 72 supplies current for the exterior circuit and a source of electro-motive force 73 supplies current for the plate of the amplifier. Suitable switches and resistance controlling devices may be provided where convenient for controlling the operation of the machine. We have referred herein to the measurement of light reflected by the blade edge and have used that term in a broad sense to include specular and diffuse reflection as well as scattering of light by the blade edge.

Having thus described our invention what we claim as new and desire to secure by Letters Patent of the United States is:—

1. An edge testing machine, having in combination, means for progressively advancing a sharp edged blade across the path of a beam of light, means for making a visual indication of the amount of light reflected by the sharp edge of the blade during such movement, and means for causing the position of the indication to change progressively in definitely timed relation to the advancing movement of the blade.

2. An edge testing machine, having in combination, means for advancing a sharp edged blade across the path of a beam of light, and means for making a visual indication of the amount of light reflected by the sharp edge of the blade during such movement, said means being movable in definitely timed relation to the advancing movement of the blade.

3. An edge testing machine, having in combination, means for accurately advancing a sharp edged blade across the path of a beam of light, an optical system for making a visual indication of the amount of light reflected by the sharp edge of the blade during such movement, and mechanical means for progressively varying the location of the indication in accordance with said movement of the blade.

4. An edge testing machine, having in combination, means for advancing a sharp edged blade endwise across the path of a light beam, means for measuring the amount of light reflected by successive portions of the sharp edge of the blade during such movement, optical means for making a visual indication of said measurement, and mechanical means for shifting the location of said indication in accordance with the position of the blade.

5. An edge testing machine, having in combination, means for relatively moving a sharp edged blade and a light beam to cause the beam to traverse the edge of the blade, means for measuring the amount of light reflected by successive portions of the edge and for making an indication in accordance therewith, related mechanisms for causing the position of said indication to vary in accordance with movement of the blade and the degree of said measurement.

6. An edge testing machine, having in combination, means for traversing the edge of a blade from end to end by a light beam, photo-electric means for measuring the amount of light reflected by successive portions of the sharp edge, means including a galvanometer connected to said measuring means for making an indication of the degree of said measurements, and means for varying the position of said indication in accordance with said traversing movement of the blade and light beam.

7. An edge testing machine, having in combination, means for traversing the edge of a blade by a light beam directed thereto, photo-electric means for measuring the amount of light reflected by successive portions of the vertex of said sharp edge, a galvanometer actuated by current from said photo-electric means and having a mirror for indicating the degree of measurement, and means for deflecting the indicating beam from said mirror in accordance with the movement of the blade.

8. An edge testing machine, having in combination, means for traversing the edge of a blade from end to end by a light beam directed thereto, photo-electric means for measuring the amount of light reflected by successive portions of the vertex of said sharp edge, a source of light, and means for causing a light beam therefrom to be deflected in accordance with the position of the blade and the progressive measurements of said reflected light.

9. An edge testing machine, having in combination, a reflector, means for traversing the edge of a blade by a light beam directed thereto and for correspondingly moving said reflector, photo-electric means for measuring the light reflected by successive portions of the edge vertex, and means responsive to such measurements for directing a second light beam to said moving reflector.

10. An edge testing machine, having in combination, a reflector, means for traversing the edge of a blade by a light beam directed thereto and for simultaneously moving said reflector about a predetermined axis, photo-electric means for measuring the light reflected by successive portions of the edge vertex, and means responsive to said measurements for moving a second light beam projected at substantially right angles to said reflector.

11. An edge testing machine, having in combination, means for traversing the edge of a blade by a light beam directed thereto at an angle to the face of the blade, including a source of light and a blade carrier relatively movable in a path at right angles to a light beam therefrom, means for adjusting the blade carrier toward or from the source of light, and means for measuring the amount of light reflected from the vertex of the edge of the blade.

12. An edge testing machine, having in combination, a source of light arranged to direct a light beam in a defined path at an oblique angle to the blade, a photo-electric cell located at a distance therefrom, and a blade carrier for positioning a blade with the vertex of its edge located to reflect to said photo-electric cell a portion of the light beam and having provision for adjustment in a direction to vary the point of incidence of the light beam upon the blade.

13. An edge testing machine, having in combination, a source of light, means enclosing the same and providing a narrow vertical aperture for a light beam, a carrier movable in a horizontal path to present progressively the sharpened edge of a blade at an angle to the light beam, means for measuring the amount of light reflected from successive portions of the edge vertex, and a rotary shutter for closing the aperture when the carrier has been moved to a predetermined point in its travel.

14. An edge testing machine, having in combination, means for traversing the edge of a blade by a light beam, means for making a visible spot of light, and means for moving the said spot of light to indicate the amount of light reflected by progressive portions of the vertex of the edge of said blade.

15. An edge testing machine, having in combination, means for traversing the edge of a blade by a light beam and for measuring the amount of light reflected by the vertex of its edge at successive points, a translucent plate, and means for moving a spot of light across said plate in a path controlled by said measuring means and indicating the amount of light reflected by successive portions of the edge of said blade.

16. An edge testing machine, having in combination, mechanism for traversing the edge of a blade by a light beam and means for measuring the amount of light reflected by progressive portions of the vertex of the edge of the blade, including a light source, a translucent plate, movably mounted means for directing a light beam from said light source to said plate, and means interconnecting said traversing mechanism and said light beam directing means for moving the light beam across the plate at an augmented rate for indicating such measurements.

17. An edge testing machine, having in combination, means for traversing the edge of a blade by a light beam, a mirror connected to said means and moved thereby proportionately to said traversing movement, means for measuring the amount of light reflected by progressive portions of the vertex of the edge of said blade, and means operatively connected to said measuring means for variably directing a second light beam to said mirror in accordance with such measurements.

18. An edge testing machine, having in combination, means for traversing the edge of a blade by a light beam directed obliquely thereto, including a source of light, a carrier movably mounted in the machine and having studs for engaging an internally apertured blade and conveying it across the light beam, a stationary spring member mounted adjacent to the carrier, arranged to bear against a blade therein and being provided with a slot to receive said studs, and means for measuring the light reflected from the edge of the blade.

19. Edge testing apparatus including in its structure means movably supporting a sharp edged blade, means for directing a light beam onto the edge at an acute angle, means for moving the blade so that the edge of the blade is traversed by the light beam, a photo-electric device for measuring the amount of light reflected by said edge, a galvanometer in circuit with said photo-electric device and having a movable mirror, and an indicating system comprising means for directing a second beam of light upon the galvanometer mirror, a translucent plate, movably mounted means for directing the light beam from the mirror upon the plate, and means interconnecting said last named light directing means with said blade moving means for moving said second light beam across the plate.

20. Edge testing apparatus including in its structure means for movably supporting a sharp edged blade, means for directing a light beam onto the edge at an acute angle, means for relatively moving the blade and light beam so that the edge of the blade is traversed by the light beam, a photo-electric device for measuring the amount of light reflected by said edge, a galvanometer in circuit with said photo-electric device and having a movable mirror, and an indicating system comprising means for directing a second beam of light upon the galvanometer mirror and a scale arranged in the path of the light beam reflected by said galvanometer mirror, all in combinatiion with a light deflecting means movably supported in the path of the second beam and being operatively connected with said means for relatively moving the blade and the light beam first mentioned, so that, as the blade is traversed thereby, the position of the indicating beam along the scale is changed to show the condition of the blade edge at successive points thereon.

21. An edge testing machine, having in combination, means for traversing the edge of a blade by a light beam, an oscillatory mirror connected to said means and arranged to be turned thereby through an angle proportional to said traversing movement, a photo-electric cell for measuring the amount of light reflected by successive portions of the blade edge, and means electrically connected to said photo-cell for variably directing a second light beam to said oscillatory mirror in accordance with such measurements.

LOUIS H. YOUNG.
MAX KNOBEL.